(12) United States Patent
Tsujita et al.

(10) Patent No.: US 11,819,013 B2
(45) Date of Patent: Nov. 21, 2023

(54) SPINNING REEL

(71) Applicants: Shimano Inc., Sakai (JP); Shimano Components (Malaysia) SDN. BHD., Johor (MY)

(72) Inventors: Naofumi Tsujita, Sakai (JP); Lin Boon Gan, Johor (MY); Kee Chuong Wong, Johor (MY)

(73) Assignees: SHIMANO, INC, Osaka (JP); SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 17/508,090

(22) Filed: Oct. 22, 2021

(65) Prior Publication Data
US 2022/0192169 A1    Jun. 23, 2022

(30) Foreign Application Priority Data
Dec. 18, 2020 (JP) ................................ 2020-210756

(51) Int. Cl.
*A01K 89/01* (2006.01)
*A01K 89/015* (2006.01)
(Continued)

(52) U.S. Cl.
CPC ......... *A01K 89/0183* (2015.05); *B65H 54/02* (2013.01); *A01K 89/006* (2013.01); *B65H 2403/40* (2013.01); *B65H 2701/355* (2013.01)

(58) Field of Classification Search
CPC ............ A01K 89/0114; A01K 89/0183; A01K 89/006; A01K 89/01; B65H 2403/40
See application file for complete search history.

(56) References Cited

U.S. PATENT DOCUMENTS

2018/0310540 A1† 11/2018 Takamatsu

FOREIGN PATENT DOCUMENTS

| EP | 2111754 A2 * | 10/2009 | ......... A01K 89/0114 |
|---|---|---|---|
| EP | 3097781 A1 * | 11/2016 | ......... A01K 89/0114 |

(Continued)

OTHER PUBLICATIONS

Daiwa Corporation; 1982 Daiwa General Catalog; pp. 18 and 19; 1982; Tokyo, Japan.†

(Continued)

*Primary Examiner* — Emmanuel M Marcelo
(74) *Attorney, Agent, or Firm* — United IP Counselors, LLC

(57) ABSTRACT

A spinning reel includes a reel body, a rotor, a spool shaft, and a drive body. The drive body has a shaft, a first gear disposed on the shaft for rotating the rotor, and a second gear disposed on the shaft for moving the spool shaft. The shaft, the first gear, and the second gear are integrally formed by forging. The first gear includes a first disk part disposed on an outer circumferential surface of the shaft, and a first tooth part protruding axially from the first disk part. The second gear includes a second disk part disposed on the outer circumferential surface of the shaft to be spaced apart from the first disk part, and a second tooth part protruding from the second disk part radially away from an axis of the shaft. The second tooth part has a tip diameter smaller than an inner diameter of the first tooth part.

14 Claims, 4 Drawing Sheets

(51) Int. Cl.
    *B65H 54/02*     (2006.01)
    *A01K 89/00*     (2006.01)

(56)     References Cited

FOREIGN PATENT DOCUMENTS

| | | | |
|---|---|---|---|
| JP | 2002-034397 A | | 2/2002 |
| JP | 2004267199 A | † | 9/2004 |
| JP | 2020028250 A | † | 2/2020 |

OTHER PUBLICATIONS

Daiwa Corporation; 1984 Fishing Tackle Catalog; p. 16 and 17; 1984; Tokyo, Japan.†
Daiwa Corporation; Excite Fishing; p. 63; 1987; Tokyo, Japan.†
Daiwa Corporation; The Super Technology 1985; p. 13; 1985; Tokyo, Japan.†

\* cited by examiner
† cited by third party

SPINNING REEL

CROSS-REFERENCE TO RELATED APPLICATIONS

This application claims priority to Japanese Patent Application No. 2020-210756, filed Dec. 18, 2020. The contents of that application are incorporated by reference herein in their entirety.

TECHNICAL FIELD

The present invention relates to a spinning reel.

BACKGROUND ART

Spinning reels have been conventionally disclosed that include a drive body used for rotating a rotor and moving a spool shaft (see Japanese Unexamined Patent Application Publication No. 2002-34397). The drive body includes a drive shaft, a drive gear, and a sliding gear. The drive gear is used to rotate the rotor and is integrated with the drive shaft. The sliding gear is used to move the spool shaft and is mounted on the drive shaft as a separate member.

BRIEF SUMMARY

In the spinning reel of Japanese Unexamined Patent Application Publication No. 2002-34397, a sliding gear is mounted on the drive shaft as a separate member. In such a case, a space for mounting the sliding gear on the outer surface of the drive shaft is required between the inner surface of the sliding gear and the outer surface of the drive shaft, which increases the outer diameter of the sliding gear. The outer diameter of an interlocking gear that meshes with the sliding gear also increases. That is, the reel body of the spinning reel may increase in size.

In some cases, the drive gear and the sliding gear are integrally formed with the drive shaft by casting such as zinc die casting. Since the drive gear rotates the rotor, the drive gear is required to have a predetermined strength. However, in the case where the drive gear is integrally formed with the drive shaft by casting, the strength of the drive gear may be insufficient. Further, when a handle capable of winding with high torque is screwed into the drive shaft formed by casting, the female thread portion of the drive shaft may be crushed.

The present invention has been made in view of the above circumstances, and an object of the present invention is to provide a spinning reel configured to include a downsized reel body and a high-strength drive body.

A spinning reel according to one aspect of the present invention includes a reel body, a rotor, a spool shaft, and a drive body. The rotor is rotatably mounted on the reel body. The spool shaft is mounted on the reel body to be reciprocally movable. The drive body has a shaft, a first gear disposed on the shaft for rotating the rotor, and a second gear disposed on the shaft for moving the spool shaft. In the drive body, the shaft, the first gear, and the second gear are integrally formed by forging.

The first gear includes a first disk part disposed on an outer circumferential surface of the shaft, and a first tooth part protruding axially from the first disk part toward the second gear. The second gear includes a second disk part disposed on the outer circumferential surface of the shaft to be spaced apart from the first disk part, and a second gear protruding from the second disk part radially away from the axis of the shaft. The second tooth part has a tip diameter smaller than the inner diameter of the first tooth part.

In the spinning reel of the present invention, since the second gear for moving the spool shaft is integrally molded with the shaft, the reel body can be downsized as compared with conventional ones. Further, in the spinning reel of the present invention, since the drive body (the shaft, the first gear, and the second gear) is formed by forging, the drive body can be stronger than conventional ones.

In a spinning reel according to another aspect of the present invention, an axial distance between a tooth tip of the first tooth part and a side surface of the second tooth part is preferably equal to or less than the tip diameter of the second tooth part and is also 20% or more of the inner diameter of the first tooth part. With this configuration, the drive body can be preferably formed to have a high strength by forging.

In a spinning reel according to another aspect of the present invention, the above axial distance is preferably in the range of 5 mm to 12 mm. With this configuration, the drive body can be preferably formed to have a high strength by forging.

In a spinning reel according to another aspect of the present invention, the tip diameter of the second tooth part relative to the inner diameter of the first tooth part is preferably 30% or more and 50% or less. With this configuration, the drive body can be preferably formed to have a high strength by forging.

In a spinning reel according to another aspect of the present invention, the difference between the inner diameter of the first tooth part and the tip diameter of the second tooth part is preferably 4 mm or more and 15 mm or less. With this configuration, the drive body can be preferably formed to have a high strength by forging.

In a spinning reel according to another aspect of the present invention, the ratio of the diameter of the shaft to the tip diameter of the second tooth part is preferably 50% or more and 70% or less. With this configuration, the drive body can be preferably formed to have a high strength by forging.

In a spinning reel according to another aspect of the present invention, the diameter of the shaft is preferably 6 mm or more and 12 mm or less. In this case, since the driving body is formed by forging, the diameter of the shaft portion is made smaller than conventional ones. As a result, the outer diameter of the second gear on the shaft can also be reduced, so that the reel body can be downsized as compared with conventional ones.

The present invention enables downsizing of a reel body and formation a high-strength drive body of a spinning reel.

DETAILED DESCRIPTION

Figure 1:
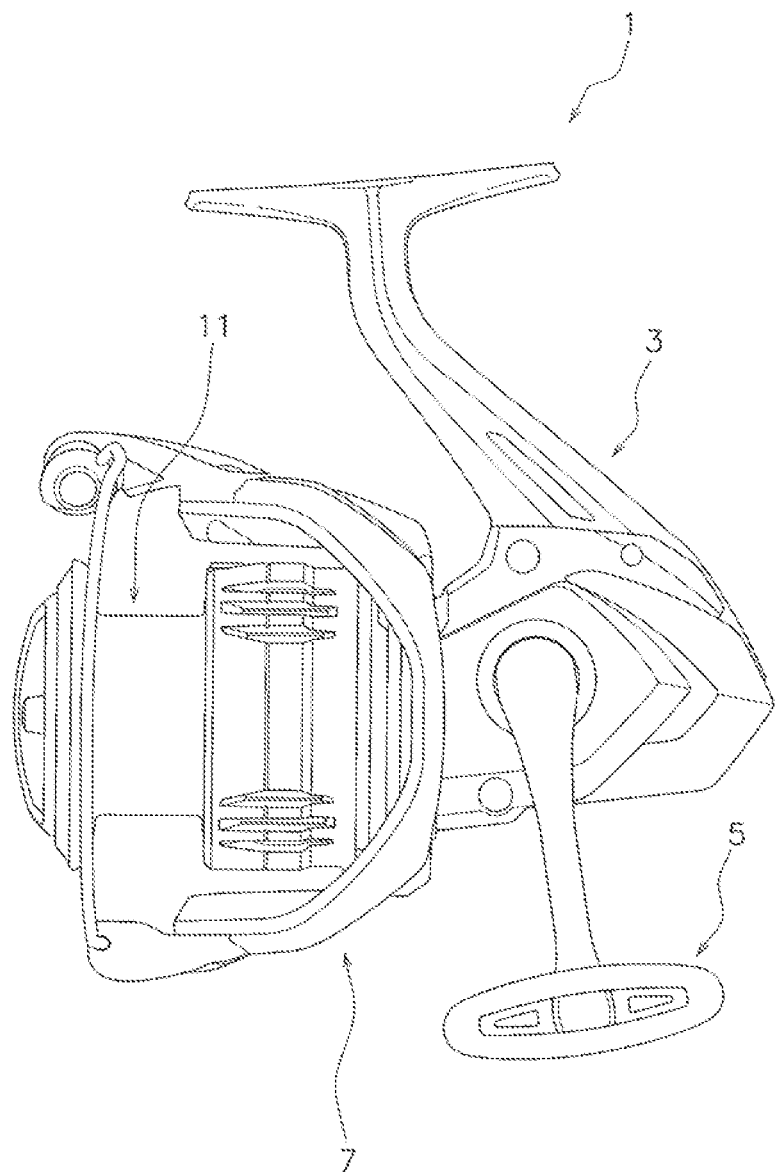
FIG. 1 is a side view of a spinning reel according to an embodiment of the present invention.
Figure 2:
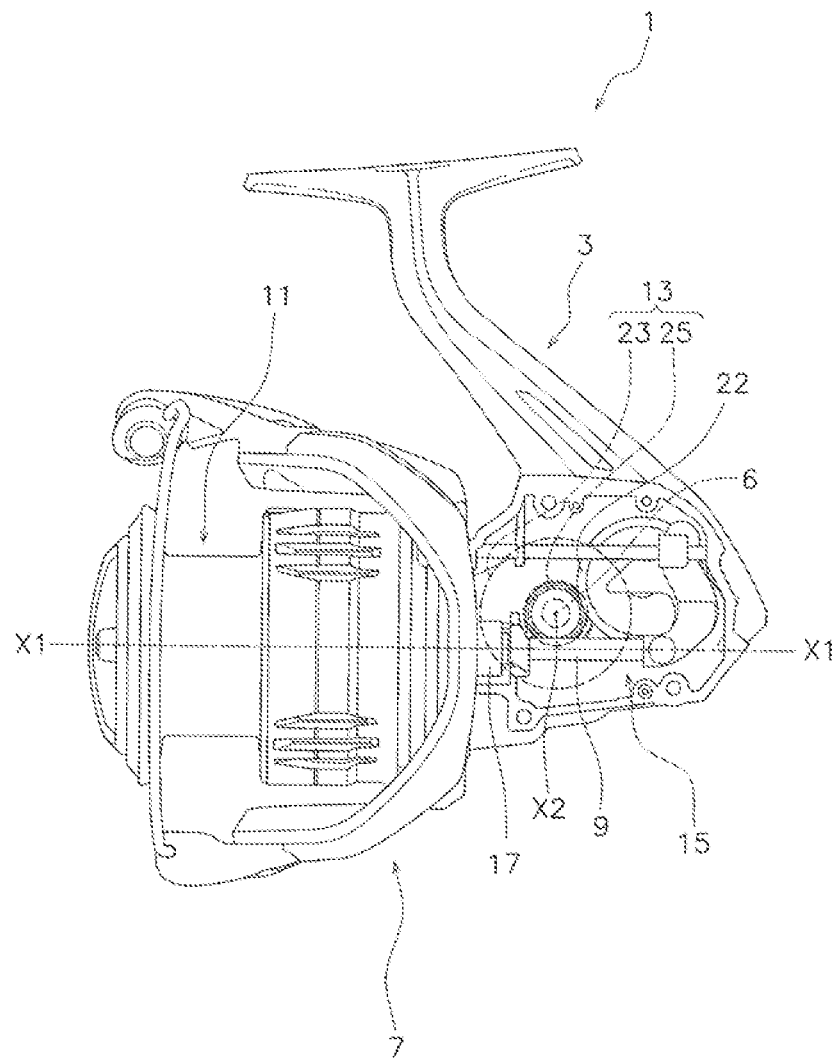
FIG. 2 is a side view with a side cover and a drive body removed from the spinning reel.

As shown in FIG. 1, a spinning reel 1 that adopts one embodiment of the present invention includes a reel body 3, a rotor 7, a spool shaft 9 (see FIG. 2), and a drive body 13 (see FIG. 2). Specifically, the spinning reel 1 includes the reel body 3, a handle 5, the rotor 7, the spool shaft 9 (see FIG. 2), a spool 11, and the drive body 13 (see FIG. 2).

As shown in FIG. 1, the handle 5 is rotatably supported by the reel body 3. In the present embodiment, the handle 5 is disposed on the left side of the reel body 3, but the handle 5 may be disposed on the right side of the reel body 3. As shown in FIG. 2, the reel body 3 has an internal space where an oscillating mechanism 15 is arranged for moving the spool 11 in a front-rear direction. Since the oscillating mechanism 15 has a substantially conventional configuration, the description will be omitted here.

The rotor 7 is used to wind a fishing line around the spool 11. As shown in FIGS. 1 and 2, the rotor 7 is disposed on the front of the reel body 3. The rotor 7 is configured to be rotatable with respect to the reel body 3. For example, as shown in FIG. 2, the rotor 7 is connected to a pinion gear 17 to be rotatable together. The pinion gear 17 is rotatably supported by the reel body 3. The rotor 7 rotates in accordance with the rotation of the pinion gear 17.

As shown in FIG. 2, the spool shaft 9 is configured to be reciprocally movable with respect to the reel body 3. For example, the spool shaft 9 is supported by the reel body 3 to be able to advance and retreat. Specifically, the spool shaft 9 is inserted into the inner peripheral portion of the tubular pinion gear 17. The spool shaft 9 reciprocates in the front-rear direction with respect to the reel body 3 by the operation of the oscillating mechanism 15. The front-rear direction is a direction in which a spool axis X1 of the spool shaft 9 extends.

A fishing line is wound around the spool 11. As shown in FIG. 2, the spool 11 is configured to be movable integrally with the spool shaft 9. For example, the spool 11 is attached to the tip of the spool shaft 9.

Figure 3:
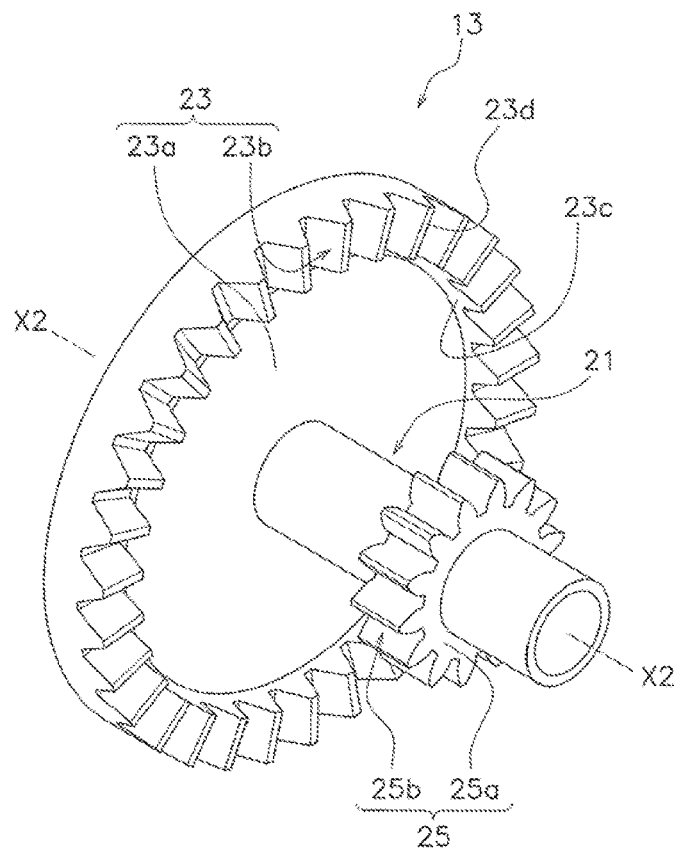
FIG. 3 is a perspective view of the drive body.

As shown in FIG. 3, the drive body 13 includes a drive shaft 21 (an example of the shaft), a drive gear 23 (an example of the first gear), and a sliding gear 25 (an example of the second gear). The drive shaft 21, the drive gear 23, and the sliding gear 25 are integrally formed by forging.

The drive shaft 21 rotates in accordance with the rotation of the handle 5. The drive shaft 21 has a drive axis X2 (an example of the axis). The drive shaft 21 is fitted with a handle shaft 6 of the handle 5 (see FIG. 2). For example, the drive shaft 21 is tubular in shape. The handle shaft 6 is detachably attached in the inner peripheral portion of the drive shaft 21.

The drive gear 23 is used to rotate the rotor 7. As shown in FIG. 3, the drive gear 23 is mounted on the drive shaft 21. The drive gear 23 meshes with the pinion gear 17 (see FIG. 2).

As shown in FIG. 3, the drive gear 23 has a first disk part 23a and a first tooth part 23b. The first disk part 23a is mounted on the outer circumferential surface of the drive shaft 21. For example, the first disk part 23a is integrally formed with the drive shaft 21 by forging.

The first tooth part 23b protrudes from the first disk part 23a toward the sliding gear 25 in an axial direction of the drive shaft 21. The first tooth part 23b is integrally formed with the outer periphery of the first disk part 23a by forging. The first tooth part 23b is composed of a plurality of gear teeth. The axial direction is a direction in which the drive axis X2 extends.

The sliding gear 25 is used to move the spool shaft 9. As shown in FIG. 3, the sliding gear 25 is mounted on the drive shaft 21. As shown in FIG. 2, the sliding gear 25 meshes with a cam gear 22 of the oscillating mechanism 15. The oscillating mechanism 15 operates in accordance with the rotation of the sliding gear 25.

As shown in FIG. 3, the sliding gear 25 includes a second disk part 25a and a second tooth part 25b. The second disk part 25a is disposed on the outer circumferential surface of the drive shaft 21 and spaced apart from the first disk part 23a. For example, the second disk part 25a is integrally formed with the drive shaft 21 by forging.

The second tooth part 25b protrudes from the second disk part 25a in a radial direction away from the drive axis X2. The second tooth part 25b is integrally formed on the outer periphery of the second disc part 25a by forging. The second tooth part 25b is composed of a plurality of gear teeth.

Figure 4:
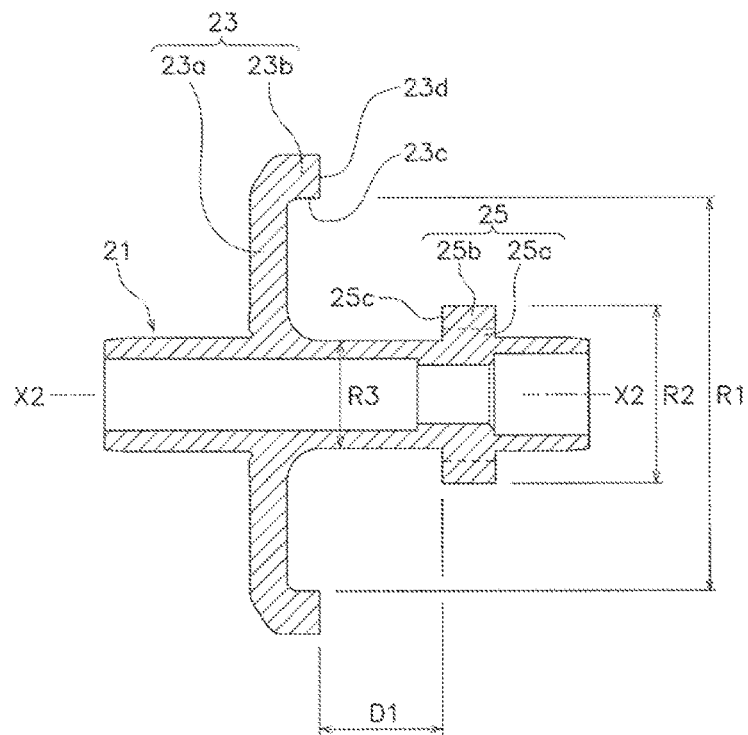
FIG. 4 is a cross-sectional view of the drive body.
Figure 5:
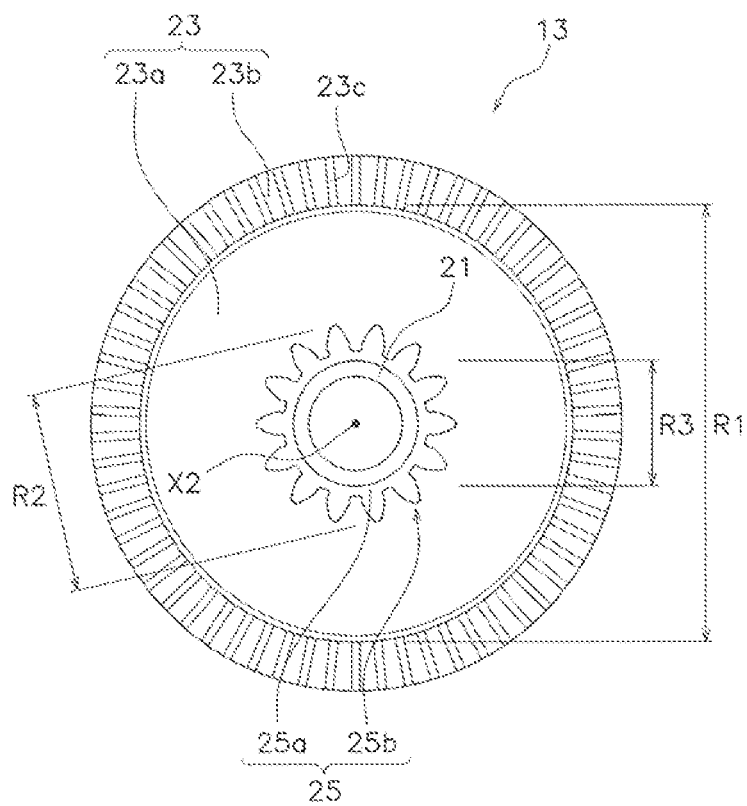
FIG. 5 is a front view of the drive body.

As shown in FIGS. 4 and 5, a tip diameter R2 of the second tooth part 25b is smaller than an inner diameter R1 of the first tooth part 23b. The first tooth part 23b has an inner circumferential surface 23c that is the radially inner-side surface of the first tooth part 23b.

For example, as shown in FIG. 5, when the drive body 13 is viewed from the outside in the axial direction, the inner circumferential surface 23c of the first tooth part 23b is circular. In other words, the inner diameter R1 of the first tooth part 23b is the diameter of the circle defined by the inner circumferential surface 23c of the first tooth part 23b.

In the spinning reel 1 of the above configuration, the drive shaft 21, the drive gear 23, and the sliding gear 25 are integrally formed by forging, as described above. In this configuration, the drive shaft 21, drive gear 23, and sliding gear 25 are preferably formed as follows.

As shown in FIG. 4, an axial distance D1 between a tooth tip 23d of the first tooth part 23b and a side surface 25c of the second tooth part 25b is equal to or less than the tip diameter R2 of the second tooth part 25b and is also 20% or more of the inner diameter R1 of the first tooth part 23b. Under these conditions, the axial distance D1 is preferably in the range of 5 mm to 12 mm. The side surface 25c of the second tooth part 25b is a side surface located on the first tooth part 23b side in the axial direction.

The tip diameter R2 of the second tooth part 25b relative to the inner diameter R1 of the first tooth part 23b is 30% or more and 50% or less. Under these conditions, the difference (=R1−R2) between the inner diameter R1 of the first tooth part 23b and the tip diameter R2 of the second tooth part 25b is preferably 4 mm or more and 15 mm or less.

A ratio P (=R3/R2) of a diameter R3 of the drive shaft 21 to the tip diameter R2 of the second tooth part 25b is 50% or more and 70% or less. Under these conditions, the diameter R3 of the drive shaft 21 is preferably 6 mm or more and 12 mm or less.

The diameter R3 of the drive shaft 21 is preferably defined at the thinnest part of the drive shaft 21. For example, in FIG. 4, the part of the drive shaft 21 between the drive gear 23 and the sliding gear 25 is the thinnest in the drive shaft 21.

The spinning reel 1 described above has the following features.

In the spinning reel 1, the sliding gear 25 for moving the spool shaft 9 is formed integrally with the drive shaft 21, and thereby the reel body 3 can be downsized compared to conventional ones. Also, in the spinning reel 1, since the drive body 13 (including the drive shaft 21, the drive gear 23, and the sliding gear 25) is formed by forging, the drive body 13 can be stronger than conventional ones.

In the spinning reel 1, the axial distance D1 between the tooth tip 23d of the first tooth part 23b and the side surface 25c of the second tooth part 25b is equal to or less than the tip diameter R2 of the second tooth part 25b and is also 20% or more of the inner diameter R1 of the first tooth part 23b.

With this configuration, the drive body 13 having high strength can be formed by forging.

In the spinning reel 1, the axial distance D1 is 5 mm or more and 12 mm or less. With this configuration, the drive body 13 having high strength can be more preferably formed by forging.

In the spinning reel 1, the tip diameter R2 of the second tooth part 25b relative to the inner diameter R1 of the first tooth part 23b is 30% or more and 50% or less. With this configuration, the drive body 13 having high strength can be more preferably formed by forging.

In the spinning reel 1, the difference (=R1−R2) between the inner diameter R1 of the first tooth part 23b and the tip diameter R2 of the second tooth part 25b is 4 mm or more and 15 mm or less. With this configuration, the drive body 13 having high strength can be more preferably formed by forging.

In the spinning reel 1, the ratio P (=R3/R2) of the diameter R3 of the drive shaft 21 to the tip diameter R2 of the second tooth part 25b is 50% or more and 70% or less. With this configuration, the drive body 13 having high strength can be preferably formed by forging.

Furthermore, in the spinning reel 1, the diameter R3 of the drive shaft 21 is 6 mm or more and 12 mm or less. In this case, since the drive body 13 is formed by forging, the diameter R3 of the drive shaft 21 is smaller than conventional ones. As a result, the outer diameter of the sliding gear 25 on the drive shaft 21 can also be made smaller, so that the reel body 3 can be downsized as compared with conventional ones.

As further shown in FIG. 4, a central bore extends longitudinally along the length of the drive shaft 21, from one end of the drive shaft 21 to the opposite end of the draft shaft 21 and centered on the drive axis X2. Notably, one section of the central bore, over which the sliding gear 25 is located, has a reduced internal diameter relative to the internal diameter of the central bore on either side of the reduced-diameter section of the central bore. This reduction in internal diameter yields greater wall thickness of the drive shaft 21 in the vicinity of the sliding gear 25, and therefore greater torsional strength to withstand torsional loads imparted to the drive shaft 21 via the sliding gear 25.

The invention is applicable to spinning reels that include a first gear for rotating a rotor and a second gear for moving a spool shaft.

REFERENCE SIGNS LIST

1 Spinning reel
3 Reel body
7 Rotor
9 Spool shaft
13 Drive body
21 Drive shaft
23 Drive gear
23a First disk part
23b First tooth part
23c Inner circumferential surface of first tooth part
23d Tooth tip of first tooth part
25 Sliding gear
25a Second disk part
25b Second tooth part
25c Side surface of second tooth part
D1 Axial distance
P Ratio
R1 Inner diameter of first tooth part
R2 Tip diameter of second tooth part
R3 Diameter of drive shaft

What is claimed is:

1. A spinning reel, comprising:
   a reel body;
   a rotor rotatable relative to the reel body;
   a spool shaft reciprocally movable relative to the reel body; and
   a drive body including a shaft, a first gear disposed on the shaft to rotate the rotor, and a second gear disposed on the shaft to cause the spool shaft to reciprocate with rotation of the rotor, wherein the shaft, the first gear, and the second gear are integrally formed by forging,
   the shaft having an axially extending central bore that extends from one end of the shaft to the opposite end of the shaft, the central bore having one section with reduced internal diameter over which the second gear is disposed, the reduction in internal diameter of the central bore in said one section causing said one section to have greater wall thickness than other sections of said central bore on axially opposite sides of said one section;
   the first gear including a first disk part disposed on an outer circumferential surface of the shaft, and a first tooth part protruding axially from the first disk part toward the second gear, and
   the second gear including a second disk part disposed on the outer circumferential surface of the shaft to be spaced apart from the first disk part, and a second tooth part protruding from the second disk part radially away from an axis of the shaft,
   wherein the second tooth part has a tip diameter smaller than an inner diameter of the first tooth part.

2. The spinning reel according to claim 1, wherein an axial distance between a tooth tip of the first tooth part and a side surface of the second tooth part is equal to or less than the tip diameter of the second tooth part and 20% or more of the inner diameter of the first tooth part.

3. The spinning reel according to claim 2, wherein the axial distance is in a range of 5 mm to 12 mm.

4. The spinning reel according to claim 1, wherein the tip diameter of the second tooth part relative to the inner diameter of the first tooth part is 30% or more and 50% or less.

5. The spinning reel according to claim 4, wherein a difference between the inner diameter of the first tooth part and the tip diameter of the second tooth part is 4 mm or more and 15 mm or less.

6. The spinning reel according to claim 1, wherein a ratio of a diameter of the shaft to the tip diameter of the second tooth part is 50% or more and 70% or less.

7. The spinning reel according to claim 6, wherein the diameter of the shaft is 6 mm or more and 12 mm or less.

8. A drive body for a spinning reel, the drive body comprising:
   a shaft extending along a drive axis;
   a first gear disposed on the shaft, the first gear including a first disk part disposed on the shaft and at least one tooth protruding axially from the first disk part to a respective tooth tip; and
   a second gear disposed on the shaft spaced apart from the first gear, the second gear including a second disk part disposed on the shaft and at least one tooth protruding radially away from the second disk part to a respective tooth tip;

the shaft having an axially extending central bore that extends from one end of the shaft to the opposite end of the shaft, the central bore having one section with reduced internal diameter over which the second gear is disposed, the reduction in internal diameter of the central bore in said one section causing said one section to have greater wall thickness than other sections of said central bore on axially opposite sides of said one section the shaft, the first gear, and the second gear being integrally formed by forging.

9. The drive body according to claim 8, wherein the second gear includes two teeth opposite each other with respect to the drive axis and defining a tip diameter between respective tips of the second gear teeth.

10. The drive body according to claim 9, wherein a distance between the tip of the first gear tooth and a side surface of one of the second gear teeth is equal to or less than the tip diameter of the second gear.

11. The drive body according to claim 9, wherein the first gear includes two teeth opposite each other and defining an inner diameter of the first gear between the two teeth.

12. The drive body according to claim 11, wherein a ratio of the tip diameter of the second gear to the inner diameter of the first gear is between 30% and 50%.

13. The drive body according to claim 11, wherein a difference between the inner diameter of the first gear and the tip diameter of the second gear is between 4 mm and 15 mm.

14. The drive body according to claim 9, wherein a ratio of a diameter of the shaft to the tip diameter of the second gear is between 50% and 70%.

\* \* \* \* \*